United States Patent
Childers et al.

(10) Patent No.: US 6,755,367 B2
(45) Date of Patent: Jun. 29, 2004

(54) SENSING POSITION OF PIN ON TAPE INSIDE CARTRIDGE SHELL

(75) Inventors: Edwin Ralph Childers, Tucson, AZ (US); Mark Allan Taylor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 10/114,273

(22) Filed: Apr. 2, 2002

(65) Prior Publication Data

US 2003/0183714 A1 Oct. 2, 2003

(51) Int. Cl.$^7$ ................................................ G03B 1/58
(52) U.S. Cl. ............................................................ 242/332.5
(58) Field of Search ......................... 242/332.2, 332.4, 242/348.2, 532.7; 360/95, 85, 132; 324/207.16

(56) References Cited

U.S. PATENT DOCUMENTS

| | | | | |
|---|---|---|---|---|
| 3,479,582 A | * | 11/1969 | Meyer | .................. 324/207.16 |
| 4,452,406 A | * | 6/1984 | Richard | .................. 242/348.2 |
| 4,589,608 A | | 5/1986 | Rehklau et al. | |
| 4,763,217 A | * | 8/1988 | Oishi | .......................... 360/132 |
| 4,901,171 A | * | 2/1990 | Urayama et al. | .......... 360/74.6 |
| 5,454,681 A | | 10/1995 | Baur | |
| 5,542,620 A | * | 8/1996 | Ohshita | .................. 242/332.4 |
| 5,576,905 A | | 11/1996 | Garcia et al. | |
| 6,003,802 A | * | 12/1999 | Eaton et al. | ............. 242/332.4 |
| 6,064,189 A | * | 5/2000 | Frankel | ........................ 324/67 |
| 6,360,978 B1 | * | 3/2002 | Augustin et al. | ........ 242/332.4 |
| 6,505,791 B1 | * | 1/2003 | Syndikus et al. | ........ 242/477.2 |

FOREIGN PATENT DOCUMENTS

| | | | | |
|---|---|---|---|---|
| JP | 62-62252 | | 3/1987 | |
| JP | 63-53771 | | 3/1988 | |
| JP | 64-70988 | * | 3/1989 | ........... G11B/23/32 |
| JP | 1-222888 | | 9/1989 | |
| WO | WO 9965810 A1 | * | 12/1999 | ........... B65H/54/28 |

OTHER PUBLICATIONS

IBM Technical Disclosure Bulletin, "Arrangement for Detecting a Web or Tape Wrapped on a Hub", R.G. Beistle, vol. 23, No. 4, (Sep. 1980), pp. 1657–1658.

* cited by examiner

Primary Examiner—Kathy Matecki
Assistant Examiner—Scott Haugland
(74) Attorney, Agent, or Firm—Scully, Scott, Murphy & Presser; Jean M. Barkley, Esq.

(57) ABSTRACT

An arrangement for sensing the position of a leader pin on a tape which is located within a cartridge shell. The arrangement senses the position of a pin in a tape cartridge through the intermediary of either electromagnetic sensors or electrostatic detection circuitry. Additionally, provided is a method for sensing the position of a pin on a tape inside a cartridge shell by employing either electrostatic detection structure or electromagnetic sensors.

6 Claims, 2 Drawing Sheets

SENSING POSITION OF PIN ON TAPE INSIDE CARTRIDGE SHELL

BACKGROUND OF THE INVENTION

1. Field of the Invention

The present invention relates to an arrangement for sensing the position of a leader pin on a tape which is located within a cartridge shell. More particularly, the invention relates to an arrangement for sensing the position of a pin in a tape cartridge through the intermediary of either electromagnetic sensors or electrostatic detection means. Additionally, the invention is directed to the provision of a method of sensing the position of a pin on a tape inside a cartridge shell by employing either electrostatic detection means or electromagnetic sensors.

In the technology which is directed to tape loading apparatus, and especially in connection with high-speed precision machines for automatically loading predetermined amounts of magnetic tape into a media cassette, it is of extreme importance to be able to reliably effect the picking and/or or positioning or placement of a leader pin in media cartridges, for instance, such as but not limited to LTO cartridges, in order to obtain the necessary degree of tape drive reliability. In essence, this entails having precise knowledge over the location of the pin prior to attempting a pick, monitoring the position of the pin during picking or placement, and also being able to be able to ascertain that the pin has been properly placed so as to ensure the reliability of the tape loading operation.

In essence, a difficulty which is encountered in obtaining a precise sensing of the pin location within the cartridge shell, wherein the pin is attached to the tape or a tape leader portion, resides in that the location of the pin is normally considerably retracted within the confines of the cartridge, which is attendant with an extremely tight mechanical spacing therein. Consequently, it is extremely difficult to precisely be able to sense the location of the pin within the cartridge in the absence of any small, delicate or essentially complex mechanisms which are capable of reaching well into the interior of the media cartridge.

In the present state-of-the technology, the sensing or detection of the precise location of the pin on the tape within the cartridge shell is an essentially difficult and complex operation. Pursuant to the current state-of-the art, a drive for the cartridge magnetic tape may entail implements such as small levers on a picking mechanism adapted to physically move when the pin is positioned to extend into the picking mechanism. The prior art structure fails to provide any capability of being able to detect if the pin is in its proper location or orientation prior to attempting to pick the pin, and also exposes the mechanism to a potential hang-up or dislodging of the pin if out of place or dislocated within the tape cartridge. Furthermore, the design of the mechanism in the state-of-the art is also extremely small in size and, resultingly, fragile in nature due to the demands of the tight space within which it is designed to implement mechanical sensing in a tape cartridge, for instance, such as an LTO cartridge, and consequently is prone to reliability problems in the operation or functioning thereof.

2. Discussion of the Prior Art

Although various arrangements are presently known for sensing pin locations in magnetic tape or media cassettes, none of these are directed to essentially electromagnetic or electrostatic detection or sensing arrangements or methods as contemplated by the present invention.

Garcia et al. U.S. Pat. No. 5,576,905, which is commonly assigned to the present assignee, relates to a servo control for a bi-directional reel-to-reel tape drive employing fine-line tachometers with index lines. In this connection, sensing of pin locations is implemented through the intermediary of tachometers in order to enable the by-directional recording and playback of information in either tape direction. In that particular instance optical sensors are utilized in a tachometer assembly to produce index pulses on a signal line whenever a index line is at a predetermined reference position in a tachometer. This enables a fine-line output of a leader block notch on the magnetic tape to be determined at the appropriate tape threading position.

Rehklau et al. U.S. Pat. No. 4,589,608 discloses a cassette loading apparatus wherein various mechanical devices are adapted to provide for appropriate tape positioning in the loading of a magnetic tape cassette. There is no disclosure of an electromagnetic or electrostatic detection arrangement or sensors for determining the placement of the pins on magnetic tapes within media cassettes.

Similarly, Baur U.S. Pat. No. 5,454,681 discloses an automatic archiving and retrieval system for computer data storage cassettes. Again, as in the previously referenced publications, there is no disclosure of any electrostatic detection or electromagnetic sensor means for determining the proper placement of a pin on a magnetic media tape within a cartridge shell.

Japanese Patent Publications JP 1222888A and JP 63053771A each disclose cartridge magazines and methods for detecting pin positioning by means of a robot. However, this type of structure does not concern itself with the positioning of a pin on a tape within a cartridge shell adapted to provide for the feed of a magnetic tape.

The foregoing is also set forth in Japanese Patent Publication JP62062252A, wherein a pin position detector is provided for primarily detecting pins on an integrated circuit package, and is not designed for the pin picking or placement in a magnetic tape cartridge through the intermediary of either electromagnetic or electrostatic detection means or sensors.

Moreover, IBM Technical Disclosure Bulletin, Volume 23, No. 4 of September 1980, pages 1657 and 1658 relates to an arrangement for detecting a web or tape wrapped on a hub. In that instance, the detection arrangement senses as to when more than one turn of a magnetic tape is wrapped around the hub of a take-up reel. There is no consideration given to the placement or correct positioning of a tape leader pin in a media cartridge analogous to that provided for by the present invention.

SUMMARY OF THE INVENTION

Accordingly, in order to improve upon the present state-of-the technology in the determination or sensing of a position of a pin on a tape within a cartridge shell, particularly for but not limited to media cartridges such as LTO cartridges, in order to attain tape drive reliability, the invention provides for the detection of pin location from the exterior of the cartridge in either electromagnetic or electrostatic modes without having to physically enter the interior of the cartridge shell. This sensing or detection of the pin can be readily achieved by monitoring the changes in the electrical properties of an electromagnetic circuit, or through the intermediary of electrostatic detection means.

In particular, the correct position of the pin on the tape leader within the cartridge shell can be readily determined, pursuant to a first embodiment, by positioning an electromagnetic circuit in the drive at such a position whereby the pin alters the inductance of the electromagnetic circuit when it is located in the correct position in the cartridge upon the cartridge being properly located within the drive. Basically, the inductance will be reduced for pins which are made of a conductive ferrous material; for instance, iron/steel. Non-ferrous pins; or stainless steel pins do not cause the inductance to be reduced, but modified by the introduction of eddy currents into the pins. In this connection, the sensing of the pin in the cartridge is achieved by locating the electromagnetic circuit at opposite external ends of the pin, and whereby alternative electromagnetic circuits can be employed depending upon the sensitivity and electromagnetic and conductive properties of the pin, in this instance, being possibly constituted of a stainless steel material as commonly employed in LTO cartridges.

Alternatively, in particular instances when it is not desired to provide for a pin on the tape which is constituted of such a metallic, electromagnetically-sensed material, rather than the foregoing, sensing is effected through electrostatic detection means.

Pursuant to specific embodiments of the invention, electromagnetic circuitry can be employed in order to detect both the top and bottom of the tape leader pin independently if each other, and which renders it able to derive the positioning or possible misalignment of the pin on the tape at opposite sides of the cartridge shell.

Pursuant to a further arrangement of the invention, multiple sensors can be arranged on each side of the cartridge, so as to facilitate monitoring the pin position during picking and placement of the pin in the cartridge. In that type of arrangement utilizing multiple pin sensing structure, it is possible to detect the situation in which the pin has proper placement and is being extracted from the media cartridge in the proper orientation thereof. However, upon detection of the pin as not being picked properly, error recovery procedures can be implemented in an attempt to appropriately align the pin in the media cartridge, or to abort the loading thereof prior to removing the pin from the cartridge, subsequent to which it would be impossible to replace the pin if improperly oriented.

Accordingly, it is an object of the present invention to provide for a novel arrangement for sensing the position of a pin on a tape within the cartridge shell of a media cartridge.

Another object of the invention is to provide for an arrangement for sensing the position of a pin on a tape within a cartridge shell, which the opposite ends of the pin are electromagnetically sensed or electrostatically detected independently of each other from the exterior of the cartridge shell.

Yet another object of the present invention is to provide an arrangement for sensing the pin in a cartridge, such as a media cartridge in an electromagnetic mode, or electrostatically, whereby multiple sensors may be provided on opposite sides of the cartridge to enable monitoring the pin position within the media cartridge.

Still another object of the present invention is to provide an arrangement for sensing the pin in a magnetic tape cartridge through the utilization of an electrostatic detection mode.

A still further object resides in a provision of a method for electromagnetically sensing the position of the pin on a tape within a cartridge shell of a media cartridge.

A yet further object of the invention resides in the provision of a method for sensing the position of a pin on a tape within a cartridge shell through the application of an electrostatic detection mode.

Yet another object of the present invention is to provide a method for the detection of pins within an media cartridge the type described wherein a plurality of pin sensing arrangements are provided to enable detection as to the proper positioning of the pin upon being picked and being extracted from the cartridge in a proper orientation.

BRIEF DESCRIPTION OF THE ACCOMPANYING DRAWINGS

Reference may now be made to the following detailed description of preferred embodiments of the invention, taken in conjunction with the accompanying drawings; in which.

DETAILED DESCRIPTION OF THE PREFERRED EMBODIMENTS

Figure 1:
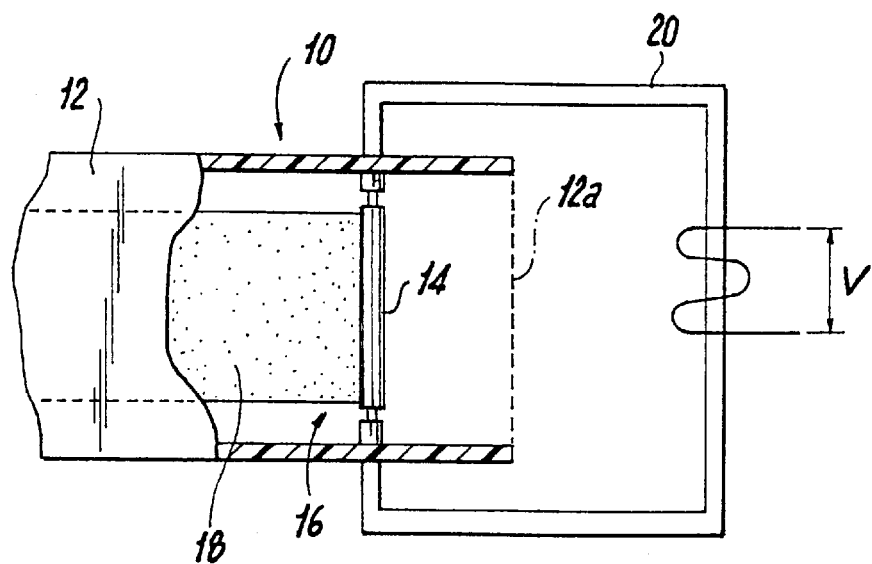
FIG. 1 illustrates, generally diagrammatically, an arrangement for electromagnetically sensing the positioning of a pin on tape in the cartridge shell of a media cartridge.

Referring in particular detail to FIG. 1 of the drawings, there is diagrammatically illustrated an end portion 10 of a cartridge shell 12. A pin 14 is either rotatbly journaled or non-rotatably supported therein, and is attached to a leading end 16 of a magnetic tape 18 as is well known in the art. The cartridge shell 12 may comprise a constituent of a magnetic tape cartridge, such as an LTO media cartridge.

In the instance in which where the pin 14 on tape is of a metallic material which can be sensed electromagnetically, the positioning of an electromagnetic circuit 20 in communication with the opposite ends of the pin 14 externally of the cartridge shell 12 enables monitoring changes in electrical properties of the electromagnetic circuit 20 in dependence upon the either appropriate or incorrect positioning of the tape pin 14. Thus, the correct placement of the pin 14 is readily determined by positioning the electromagnetic circuit 20 in the drive at a location such that the pin 14 alters the inductance V of the electromagnetic circuit when the former is in a correct orientation within the cartridge shell 12, with the media cartridge being properly located in the cassette drive.

Figure 2:
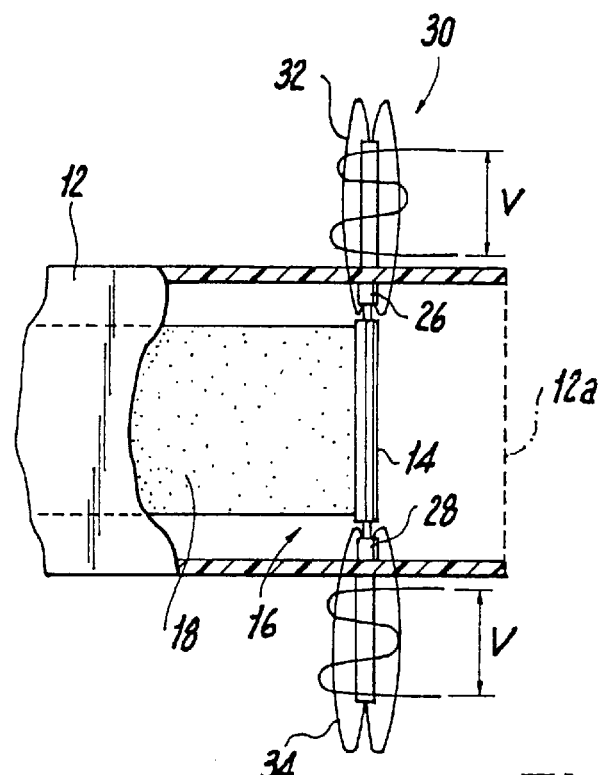
FIG. 2 illustrates the arrangement employed for sensing the pin in the media cartridge at opposite ends thereof in an independent mode relative to each end of the pin.
Figure 3:
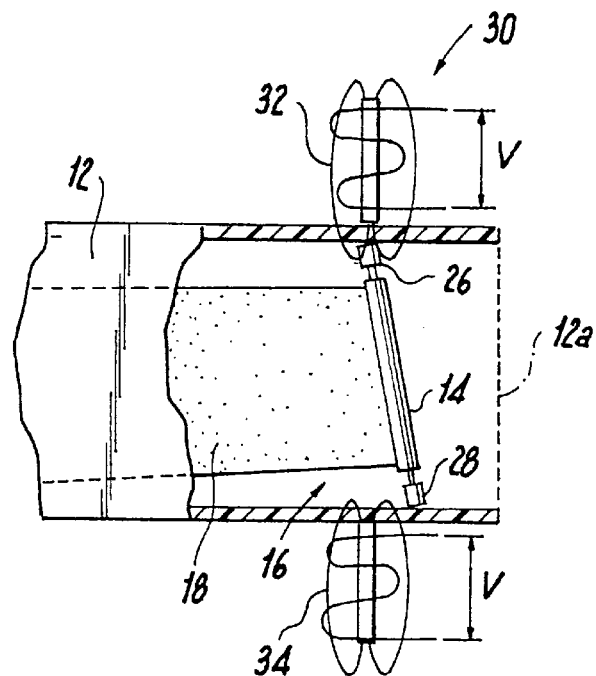
FIG. 3 illustrates a view similar to FIG. 2 showing the pin in an offset position.

Pursuant to a modified embodiment of the invention, as shown in FIGS. 2 and 3 of the drawings, the electromagnetic circuitry 30 can be independently operated at opposite pin ends, or independent circuits 32, 34 provided at, respectively, the opposite ends 26, 28 of the pin 14. This enables monitoring the pin position during the picking and/or placing of the pin in the cartridge shell 12. This type of circuitry, wherein the independent monitoring of the opposite ends of each of the pin 14 is effected, provides an improved versatility and degree of precision in measurement of the pin positioning or orientation.

Figure 4:
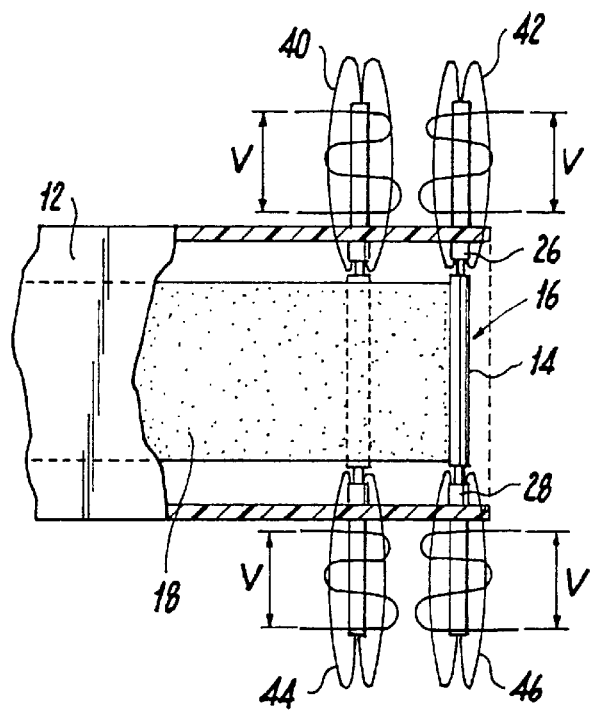
FIG. 4 illustrates an arrangement for sensing the pin in a media cartridge shell utilizing multiple sensors located on each side of the cartridge shell.

As illustrated in the embodiment of FIG. 4 of the drawings, the pin-on-tape 14 may be detected through the use of multiple electromagnetic circuits 40,42;44,46 at respectively the opposite ends of the pin 14 on the opposite sides of the cartridge shell 12. In this instance, it is possible to detect if the pin has been properly picked and is being extracted from the open end 12a of the cartridge in the proper orientation of the pin 14. Thus, if the circuits 40, 42; 44, 46 upon movement of the pin detect that the pin 14 was not properly picked, an error recovery procedure can be implemented in an attempt to realign and reseat the pin 14 properly within the cartridge, or to abort the load of the media cartridge before the pin is removed from the cartridge, subsequent to which it would be impossible to correctly replace the pin 14 if improperly picked.

Although the foregoing embodiments have been described in connection with a sensing pin positioning through the use of electromagnetic circuits, it is also possible, particularly in the instance when the pin is constituted of a material which cannot be electromagnetically sensed, to provide suitable electrical or electronic means in lieu of electromagnetic sensors, the structures of which are well known in the technology, and the constructional details of which are thus not described herein.

From the foregoing, it becomes readily apparent that, in a simple manner, it is possible to determine the proper positioning of a pin-on-tape 14 in a cassette shell 12 during picking and/or placing thereof, and if necessary to implement remedial action upon determining an incorrect positioning of the pin, by implementing the sensing in either electromagnetically or electrostatically, in dependence upon the material and properties of the pin on tape. This clearly eliminates the need for having to provide delicate mechanical structure as is the case in prior art constructions, thereby reducing expenditures and being able to effect the necessary sensing procedures in a minimum amount of time at a high degree of pin placement reliability.

While the invention has been particularly shown and described with respect to preferred embodiments thereof, it will be understood by those skilled in the art that the foregoing and other changes in form and details may be made therein without departing from the spirit and scope of the invention.

What is claimed is:

1. An arrangement for sensing the position of a pin on tape located in a media cartridge shell; said arrangement comprising:

a pin fastened to a leading end of tape being positioned in said cartridge shell proximate an open end of said cartridge shell, said pin extending between opposite end walls of said cartridge shell and having ends supported in said opposite end walls; and sensing structure comprising at least two electromagnetic circuits located externally of the opposite walls of said cartridge shell proximate the ends of said pin, said sensing structure comprising means for simultaneously detecting the location of the opposite ends of said pin so as to determine the location of said pin prior to selectively picking or placing the pin, or monitoring the orientation of the pin during picking or placing interiorly of said cartridge shell, each of said electromagnetic circuits independently sensing an opposite end of said pin for collectively determining the position and orientation of said pin within said cartridge shell.

2. An arrangement for sensing the portion of a pin on tape located in a media cartridge shell; said arrangement comprising:

a pin fastened to a leading end of tape being positioned in said cartridge shell proximate an open end of said cartridge shell, said pin extending between opposite end walls of said cartridge shell and having ends supported in said opposite end walls; and sensing structure comprising at least two electromagnetic circuits located externally of the opposite walls of said cartridge shell proximate the ends of said pin, said sensing structure comprising means for simultaneously detecting the location of the opposite ends of said pin so as to determine the location of said pin prior to selectively picking or placing the pin, or monitoring the orientation of the pin during picking or placing interiorly of said cartridge shell opposite end walls; and said sensing structure comprising a pair of mutually spaced electromagnetic circuits at respectively each outer surface of the opposite walls of said cartridge shell for independently detecting the position and orientation of the opposite ends of said pin, each of said pair of electromagnetic circuits being spaced relative to each other along said cartridge shell wall surface to facilitate detection during the picking of said pin and extraction of said pin in a proper orientation thereof.

3. An arrangement as claimed in claim 2, wherein said spacing of the paired electromagnetic circuits on each opposite surface of said cartridge shell enable implementation of corrective error procedures in the positioning of the pin in efforts to reseat the pin in the cartridge shell or to abort the loading thereof prior to removal of the pin from the cartridge shell.

4. A method of sensing the position of a pin on tape located in a media cartridge shell; said method comprising:

providing a pin fastened to a leading end of tape being positioned in said cartridge shell proximate an open end of said cartridge shell, said pin extending between opposite end walls of said cartridge shell and having ends supported in said opposite end walls; and locating sensing structure comprising at least two electromagnetic circuits externally of the opposite walls of said cartridge shell proximate the ends of said pin, said sensing structure comprising means for simultaneously detecting the location of the opposite ends of said pin so as to determine the location of said pin prior to selectively picking or placing the pin, or monitoring the orientation of the pin during picking or placing interiorly of said cartridge shell, each of said electromagnetic circuits independently sensing an opposite end of said pin for collectively determining the position and orientation of said pin within said cartridge shell.

5. A method of sensing the position of a pin on tape located in a media cartridge shell; said method comprising:

providing a pin fastened to a leading end of tape being positioned in said cartridge shell proximate an open end of said cartridge shell, said pin extending between opposite end walls of said cartridge shell and having ends supported in said opposite end walls; and locating sensing structure comprising at least two electromagnetic circuits externally of the opposite walls of said cartridge shell proximate the ends of said pin, said sensing structure comprising means for simultaneously detecting the location of the opposite ends of said pin so as to determine the location of said pin prior to selectively picking or placing the pin, or monitoring the orientation of the pin during picking or placing interiorly of said cartridge shell, each of said electromagnetic circuits independently sensing an opposite end of said pin for collectively determining the position and orientation of said pin within said cartridge shell opposite end walls; and locating a sensing structure comprising a pair of mutually spaced electromagnetic circuits at respectively each outer surface of the opposite walls of said cartridge shell for independently detecting the position and orientation of the opposite ends of said pin, each said pair of electromagnetic circuits being spaced relative to each other along said cartridge shell wall surface to facilitate detection during the picking of said pin and extraction of said pin in a proper orientation thereof.

6. A method as claimed in claim 5, wherein said spacing of the paired electromagnetic circuits on each opposite surface of said cartridge shell enable implementation of corrective error procedures in the positioning of the pin in efforts to reseat the pin in the cartridge shell or to abort the loading thereof prior to removal of the pin from the cartridge shell.

* * * * *